United States Patent [19]
Kurahashi

[11] Patent Number: 4,782,797
[45] Date of Patent: Nov. 8, 1988

[54] INDUCTION SYSTEM

[75] Inventor: Toshio Kurahashi, Fukuroi, Japan

[73] Assignee: Yamaha Hatsudoki Kabushiki Kaisha, Iwata, Japan

[21] Appl. No.: 904,981

[22] Filed: Sep. 8, 1986

Related U.S. Application Data

[63] Continuation-in-part of Ser. No. 904,510, Sep. 5, 1986.

[30] Foreign Application Priority Data

Oct. 11, 1985 [JP] Japan .................................. 60-226285

[51] Int. Cl.[4] ............................................. F02B 75/18
[52] U.S. Cl. .................................. 123/52 MV; 123/568
[58] Field of Search ........ 123/52 M, 52 MV, 52 MC, 123/568

[56] References Cited

U.S. PATENT DOCUMENTS

| | | | |
|---|---|---|---|
| 3,915,128 | 10/1975 | Rich | 123/547 |
| 4,072,133 | 2/1978 | McWhirter | 123/52 MV |
| 4,577,596 | 3/1986 | Senga | 123/52 MV |
| 4,615,324 | 10/1986 | Choushi et al. | 123/568 |
| 4,649,876 | 3/1987 | Ohmi et al. | 123/52 MV |

Primary Examiner—Charles J. Myhre
Assistant Examiner—David A. Okonsky
Attorney, Agent, or Firm—Ernest A. Beutler

[57] ABSTRACT

An induction system for a multiple cylinder internal combustion engine that employs a pair of plenum chambers with a common air inlet. An exhaust gas recirculation system is provided for distributing exhaust gases equally to the chambers of the engine by re-introducing the exhaust gases to the common air inlet through an integrally formed conduit.

15 Claims, 4 Drawing Sheets

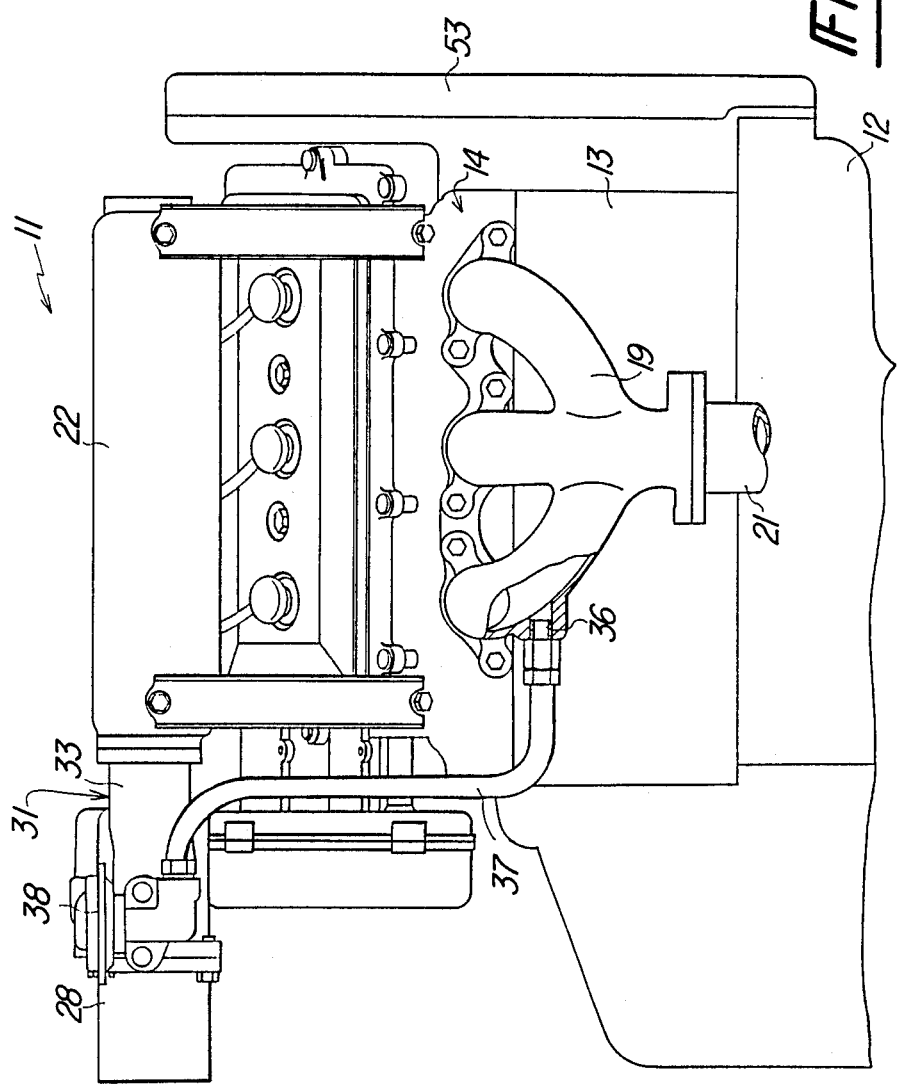

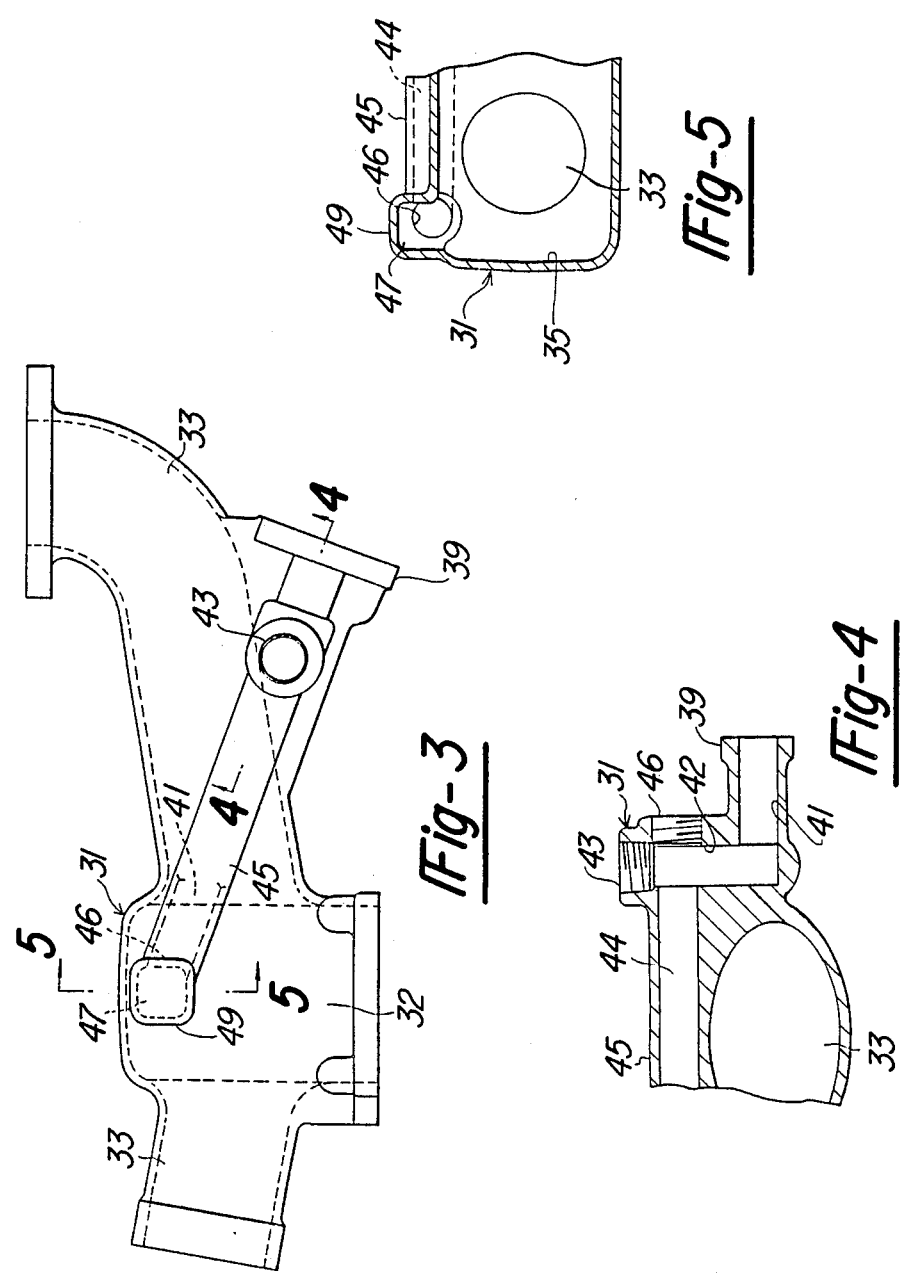

INDUCTION SYSTEM

CROSS REFERENCE TO RELATED APPLICATION

This application is a continuation-in-part of my application entitled Induction System With E.G.R., filed 09/05/86, Ser. No. 904,510, (attorney docket No. 2503-F1069) and assigned to the assignee of this application.

BACKGROUND OF THE INVENTION

This invention relates to an induction system for an engine with exhaust gas recirculation and more particularly to an engine induction and E.G.R. system that is low in cost, simple in construction and which ensures equal distribution of the exhaust gases with all cylinders of the engine.

It is well known to provide a system for recirculating a portion of the exhaust gases back into the combustion chambers so as to reduce or control the amount of nitrous oxide in the exhaust gases. Most engines are very sensitive to the amount of exhaust gases which are recirculated, and for this and other reasons, it is very important that the exhaust gases be recirculated equally to all combustion chambers of the engine. Although this can easily be done by providing separate conduits to each of the intake systems or each combustion chamber, such systems become extremely complicated, particularly when considering that the flow of exhaust gases is controlled by an exhaust gas recirculation control valve.

It is, therefore, a principal object of this invention to provide an improved induction system including E.G.R. which will ensure that the exhaust gases are equally recirculated to all of the combustion chambers of the engine through a simple and low cost structure.

Recently there has been proposed a type of induction system that is found to produce extremely good performance throughout the entire engine load and speed ranges. Such an induction system is shown in copending application Ser. No. 634,795, entitled "Intake Means Of Internal Combustion Engine" filed July 26, 1984, in the name of Masatoshi Ohmi et al, and assigned to the assignee of this invention. The induction system shown in that patent application employs a pair of plenum chambers that are spaced different distances from a given combustion chamber of the engine. Each plenum chamber serves each combustion chamber through a respective runner, and the runners associated with the closer plenum chamber are shorter and tuned for better performance at high speed. The runners going through the more distant plenum chamber are longer and are tuned for good low speed performance. Although such an induction system is extremely effective, it is difficult to ensure a simple and yet effective system for providing effective exhaust gas recirculation to all combustion chambers of such an engine.

It is, therefore, a still further object of this invention to provide an improved and simplified system for introducing exhaust gases to an engine embodying plural plenum chambers.

BRIEF DESCRIPTION OF THE INVENTION

A first feature of this invention is adapted to be embodied in an induction system for an internal combustion engine that comprises a first plenum chamber and a first series of runners for communicating the first plenum chamber with a first series of combustion chamber intakes. A second plenum chamber is also provided, and a second series of runners communicates the second plenum chamber with a second series of combustion chamber intakes. An air inlet device is provided, and means communicate that air inlet with each of the plenum chambers for introducing an air charge to the engine combustion chambers. The engine also incorporates an exhaust system for recycling engine exhaust gases and means for recycling a portion of the exhaust gases back to the combustion chamber including an E.G.R. outlet communicating with the air inlet device and with a passage formed integrally with the air inlet device.

BRIEF DESCRIPTION OF THE DRAWINGS

FIG. 2 is a side elevational view of the engine;

FIG. 3 is an enlarged top plan view of the air inlet device of the engine;

FIG. 4 is a cross-sectional view taken along the line 4—4 of FIG. 3;

FIG. 5 is a cross-sectional view taken along the line 5—5 of FIG. 3; and

DETAILED DESCRIPTION OF THE PREFERRED EMBODIMENT OF THE INVENTION

Figure 6:
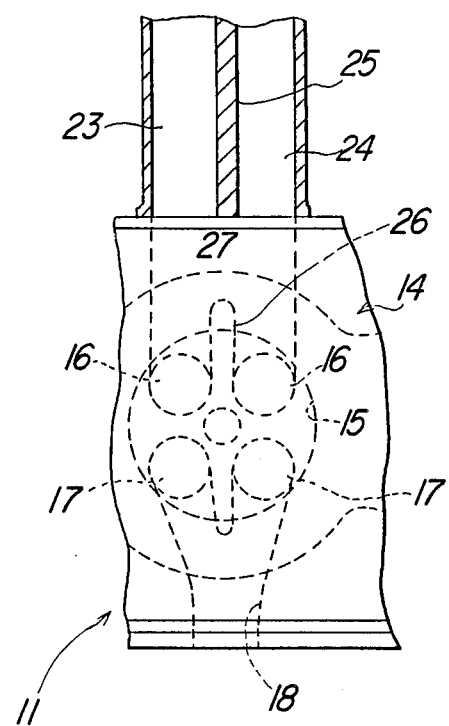
FIG. 6 is a partially schematic top plan view, with a portion broken away, showing the intake system for a given cylinder of the engine.

An engine having an induction, crankcase emission and exhaust gas recirculation system constructed in accordance with an embodiment of the invention is identified generally by the reference numeral 11. The engine 11 is depicted as being of the V-type and includes a crankcase 12 and cylinder block 13 having angularly disposed banks of cylinders. Cylinder head assemblies 14 are affixed to the respective cylinder banks. The cylinder banks are formed with cylinder bores 15 (FIG. 6) that are provided with pairs of intake valves 16 and pairs of exhaust valves 17.

The exhaust valves 17 cooperate with exhaust ports 18 that open through one side of the cylinder head and discharge the exhaust gases to respective exhaust manifolds 19. The manifolds 19, in turn discharge their gases to an exhaust system including exhaust pipes 21.

Engine 11 is provided with an induction system of the type as described in a forenoted co-pending application Ser. No. 634,795. This induction system includes a pair of plenum chambers 22 each of which is disposed in overlying relationship to a respective one of the cylinder head assemblies 14. A plurality of runners 23 extend from each plenum chamber to an intake passage of the respective adjacent cylinder head. This passage 23 serves primarily one of the intake valves 16. Because the passages 23 extend from the plenum chamber 22 to the adjacent cylinder head 14, they are relatively short in length and their effective length is tuned so as to provide good high-speed performance.

In addition, each plenum chamber 22 is provided with a second series of longer runners 24 that extend across the engine and which serve the opposite bank. Specifically, the runners 24 serve the portion of the intake passages associated with the other of the intake valves 16. As should be noted from FIG. 6, however, there is a dividing wall 25 between the runners 23 and 24, and a corresponding wall 26 between the intake valves 16 which is interrupted by a communication passageway 27 so as to provide an area of communication between the runners 23 and 24 in close proximity to the intake valves 16. This communication passageway has been found to significantly improve mid-range performance. It should be noted that the longer runners 24 have their effective length tuned so as to improve low speed running performance.

Both of the plenum chambers 22 receive air from a common source of inlet air in the form of an air inlet 28. A throttle valve 29 is supported within the air inlet 28 and is connected by means of a suitable linkage mechanism (not shown) to a suitable accelerator mechanism. The air inlet 28 communicates with an air distribution device, indicated generally by the reference numeral 31, which is found as a casting and has an inlet opening 32 which communicates with the air inlet device 28 immediately downstream of the throttle valve 29. The distribution device 31 has a generally Y shape that comprises a pair of branch passages 33 which communicate with the individual plenum chambers at their forward ends. The branch passages 33 communicate with the inlet opening 32 by means of communication openings 34 which are spaced forwardly from a rear wall 35 of the distribution device 31. Because of this arrangement, it will be ensured that there is good and equal air distribution to each of the plenum chambers 22.

In order to control the emissions of nitrous oxide, the engine 11 is provided with an E.G.R. (exhaust gas recirculation) system. It is desirable that the E.G.R. system be relatively simple in construction and have a minimum of piping and plumbing connected with it. However, is is important to ensure good distribution of the exhaust gases that are recirculated with all cylinders of the engine. To this end, one of the exhaust manifolds 19 (FIG. 2) is provided with an exhaust gas top 36 that delivers exhaust gases to a conduit 37. The conduit 37 in turn terminates at an E.G.R. valve 38 which may be controlled in accordance with any desired sequence or system of operation.

The E.G.R. valve 38 is mounted directly to a flange 39 formed intergrally with the distribution device casting 31. The E.G.R. valve 38 has its discharge opening in communication with a first passageway 41 that is drilled into the casting 31 from the flange 39. The passageway 41 extends in a generally horizontal direction, and it is intersected at its inner end by a vertically extending passageway 42. The passageway 42 is formed by drilling, and its outer face is closed by a threaded plug 43 or the like. The passageway 42 is, in turn, intersected by a further horizontally extending passageway 44 that is drilled at least in part in an embossment 45 formed in the casting of the inlet device 31. The outer end of the drilled passageway 44 is closed by a threaded plug 46.

Inner end of the passageway 44 terminates at an exhaust gas outlet opening 46 that is formed in an upstanding embossment 47 of the casting of the inlet device 31 and which defines a cavity 49 positioned adjacent the rear wall 35 of the device and forwardly of the branch passages 33. By virtue of this drilling and passageway forming, the number of conduits can be substantially reduced and a relatively inexpensive construction results. However, the device is extremely effective in ensuring equal distribution of the exhause gases to the individual plenum chambers 22 and the individual combustion chambers of the engine.

Figure 1:
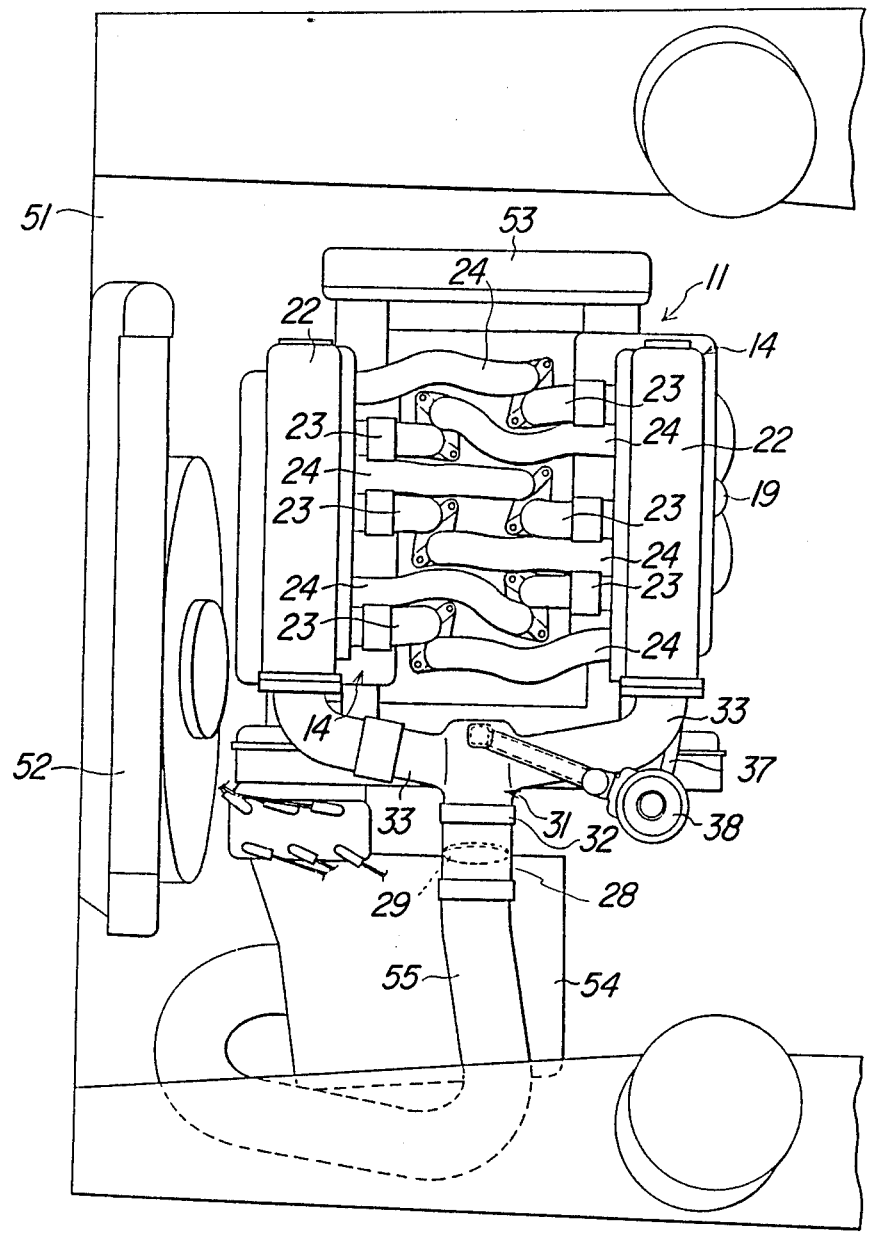
FIG. 1 is a top plan view of the engine compartment of a vehicle powered by an internal combustion engine constructed in accordance with an embodiment of the invention.

In the illustrated embodiment, the engine 11 is used to power a transverse engine front wheel drive vehicle, indicated generally by the reference numeral 51 (FIG. 1). The engine 11 is transversely disposed across the engine compartment of the vehicle 51 and is positioned to the rear of a radiator 52. A transfer drive 53 at one end of the engine transfers the drive to the final drive for the front wheels of the vehicle.

An air cleaner, indicated generally by the reference numeral 54 is positioned at one end of the engine 11 and delivers air through an elongated conduit 55 to the intake device 28.

It should be readily apparent from the foregoing description that the described system provides for effective exhaust gas and crankcase ventilation gas recirculation to the chambers of a multiple cylinder engine while ensuring good distribution to all of the chambers. Even though good distribution is provided, the amount of plumbing and conduits required is substantially reduced since the exhaust gases and crankcase gases are delivered to the common air inlet device of the two plenum chambers.

Those skilled in the art should readily understand that the foregoing description is that of the preferred embodiment of the invention, and that various changes and modifications may be made without departing from the spirit and scope of the invention, as defined by the appended claims.

What is claimed is:

1. An induction system for an internal combustion engine comprising a first plenum chamber, a first series of runners extending from said first plenum chamber to a first series of combustion chamber intakes, a second plenum chamber, a second series of runners communicating said second plenum chamber with a second series of combustion chamber intakes, an air inlet device, means for communicating said air inlet device with each of said plenum chambers for introducing an air change to the engine combustion chambers, an exhaust system for receiving engine exhaust gases, and means for recirculating a portion of said engine exhaust gases back to said combustion chambers including an E.G.R. outlet communicating with said air inlet device including a passageway formed integrally with said air inlet device.

2. In an induction system for an internal combustion engine as claimed in claim 1, wherein the passageway is drilled into a casting forming the air inlet device.

3. In an induction system for an internal combustion engine as claimed in claim 2, wherein the passageway is formed by a plurality of intersecting drilled holes, the outer ends of at least some of said holes being closed by plugs.

4. In an induction system for an internal combustion engine as claimed in claim 3, further including an E.G.R. control valve carried by said inlet device.

5. In an induction system for an internal combustion engine as claimed in claim 4, further including a throttle valve positioned in said air inlet device for controlling the flow of air to the engine and the E.G.R. outlet communicates with the air inlet device downstream of said throttle valve.

6. In an induction system for an internal combustion engine as claimed in claim 4, wherein the plenum chambers are disposed in parallel relationship to each other, and the air inlet device has a Y-shape with a single inlet portion and a pair of outlet portions each communicating with a respective one of the plenum chambers.

7. In an induction system for an internal combustion engine as claimed in claim 6, further including a single throttle valve in the common air inlet portion of the air inlet device for controlling the flow of air to both of the plenum chambers.

8. In an induction system for an internal combustion engine as claimed in claim 4, wherein the first series of runners and the second series of runners are arranged in pairs with a runner of each series communicating with the same combustion chamber of the engine.

9. In an induction system for an internal combustion engine as claimed in claim 8, further including a throttle valve positioned in said air inlet device for controlling the flow of air to the engine and the E.G.R. outlet communicates with the air inlet device downstream of said throttle valve.

10. In an induction system for an internal combustion engine as claimed in claim 4, wherein the engine is of the V-type, and each of the plenum chambers is associated with a respective bank of the engine.

11. In an induction system for an internal combustion engine as claimed in claim 10, wherein the first series of runners and the second series of runners are arranged in pairs with a runner of each series communicating with the same combustion chamber of the engine.

12. In an induction system for an internal combustion engine as claimed in claim 11, further including a single throttle valve in the common air inlet portion of the air inlet device for controlling the flow of air to both of the plenum chambers.

13. In an induction system for an internal combustion engine as claimed in claim 10, wherein each of the plenum chambers is disposed above a respective one of the cylinder banks and the inlet device is positioned at the forward end of the engine, the EGR control valve being carried by said inlet device in proximity to one of the cylinder banks.

14. In an induction system for an internal combustion engine as claimed in claim 1, wherein the engine is of the V-type, and each of the plenum chambers is associated with a respective bank of the engine.

15. In an induction system for an internal engine as claimed in claim 14, further including an EGR control valve carried by said inlet device and positioned in proximity to one of the cylinder banks.

* * * * *